United States Patent
Serdy, Jr. et al.

(10) Patent No.: US 9,292,593 B2
(45) Date of Patent: Mar. 22, 2016

(54) MOBILE FRIENDLY INTERNET SEARCHES

(75) Inventors: Frank S. Serdy, Jr., Sammamish, WA (US); Rainer J. Romatka, Bellevue, WA (US); Tyler E. Hennessy, Redmond, WA (US); Neil A. Brench, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 13/541,517

(22) Filed: Jul. 3, 2012

(65) Prior Publication Data

US 2012/0271820 A1 Oct. 25, 2012

Related U.S. Application Data

(63) Continuation of application No. 11/080,363, filed on Mar. 15, 2005, now Pat. No. 8,219,567.

(51) Int. Cl.
*G06F 17/30* (2006.01)

(52) U.S. Cl.
CPC .... *G06F 17/30613* (2013.01); *G06F 17/30147* (2013.01); *G06F 17/30867* (2013.01)

(58) Field of Classification Search
CPC .................................................. G06F 17/30147
USPC ................................... 707/756; 715/207, 866
See application file for complete search history.

(56) References Cited

U.S. PATENT DOCUMENTS

| | | | | |
|---|---|---|---|---|
| 6,236,768 B1 * | 5/2001 | Rhodes | ............ | G06F 17/30722 382/155 |
| 6,300,947 B1 * | 10/2001 | Kanevsky | ......... | G06F 17/30905 707/E17.121 |
| 6,593,944 B1 * | 7/2003 | Nicolas | ............. | G06F 17/30905 707/E17.121 |
| 6,857,102 B1 * | 2/2005 | Bickmore | ........... | G06F 17/2247 707/E17.121 |
| 7,096,492 B2 * | 8/2006 | Yamamoto | .............. | H04L 63/08 726/17 |
| 7,143,342 B1 * | 11/2006 | Baweja | ............. | G06F 17/30905 707/E17.121 |
| 2005/0154716 A1 * | 7/2005 | Watson | ............. | G06F 17/30648 707/3 |

(Continued)

OTHER PUBLICATIONS

"Mobile Web Searching", by: Kit August, Published 2002; http://onlinelibrary.wiley.com/doi/10.1002/bltj.7/pdf.*

(Continued)

*Primary Examiner* — Apu Mofiz
*Assistant Examiner* — Chelcie Daye
(74) *Attorney, Agent, or Firm* — Judy Yee; Micky Minhas; Lee & Hayes, PLLC

(57) ABSTRACT

Mobile friendly internet searches are enabled by determining if individual internet sites are mobile friendly. In a described implementation, a mobile-friendliness indication is determined for an internet site. The determined mobile-friendliness indication is stored in association with the internet site in an index that may be used for internet searching. In another described implementation, a data structure comprises an internet index with multiple internet site entries having one or more associated mobile-friendliness indications. The mobile-friendliness indications may be general affirmative indications of mobile friendliness or specific indications of mobile-friendliness that identify a specific user agent type. In yet another described implementation, a search request having search terms is received, and a search is performed based thereon to produce a search results set. If the search requestor is a mobile device, the search results are ordered responsive to mobile-friendliness indications associated with the internet sites of the search results set.

20 Claims, 9 Drawing Sheets

(56) References Cited

U.S. PATENT DOCUMENTS

| | | | |
|---|---|---|---|
| 2005/0216829 A1* | 9/2005 | Kalinichenko | G06F 17/30371 715/205 |
| 2006/0004627 A1* | 1/2006 | Baluja | H04M 3/4878 705/14.4 |
| 2006/0212451 A1 | 9/2006 | Serdy, Jr. et al. | |
| 2006/0242129 A1* | 10/2006 | Libes | G06F 17/30864 707/3 |

OTHER PUBLICATIONS

"Mobile Web Searching", By: Kit August, Published 2002; http://ieeexplore.ieee.org/stamp/stamp.jsp?tp=&arnumber=6768352.*

August et al., "Mobile Web Searching", Bell Labs Technical Journal 6(2), Aug. 2002, 2002 Lucent Technologies, Wiley Periodicals, Inc, <<www.interscience.wiley.com>>, pp. 84-98.

Non-Final Office Action for U.S. Appl. No. 11/080,063, mailed on Jun. 28, 2011, Frank S. Serdy, Jr., "Mobile Friendly Internet Searches", 22 pgs.

* cited by examiner

MOBILE FRIENDLY INTERNET SEARCHES

CROSS REFERENCE TO RELATED PATENT APPLICATION

This patent application is a continuation of co-pending and commonly owned U.S. patent application Ser. No. 11/080,363, filed Mar. 15, 2005, entitled "Mobile Friendly Internet Searches", which is hereby incorporated by reference in its entirety.

TECHNICAL FIELD

This disclosure relates in general to computer searches and in particular, by way of example but not limitation, to accommodating mobile devices in the context of internet searches.

BACKGROUND

The wealth of information available over the internet has increased significantly since its creation. Moreover, an incredible amount of information is being added on a daily basis. In fact, the total amount of information that is available via the internet makes it practically impossible to locate desired information that may be present at unknown location(s) without relying on the services of an internet search engine.

Search engines typically employ a so-called web crawler and indexer that crawls across the internet from one website to another. Each website is searched, and the terms that are discovered are added to an index of the search engine. When a search request having search terms is received from a search requestor, the search engine applies the search terms to the index and produces a set of search results. The search results are then sent to the requestor.

Each search result of the search results set usually includes a link to a website along with additional information indicating the possible relevance of the search result. Such additional information may include the title of a webpage, words found around the search terms, a relevancy score, and so forth. The search requestor can elect to view the website of one or more of the search results.

Unfortunately, many websites have pages that are not accommodating to mobile devices. Accordingly, there is a need for schemes, mechanisms, techniques, etc. that can accommodate mobile devices in the arena of internet searches and/or the field of search services.

SUMMARY

Mobile friendly internet searches are enabled by determining if individual internet sites are mobile friendly. In a described implementation, a mobile-friendliness indication is determined for an internet site. The determined mobile-friendliness indication is stored in association with the internet site in an index that may be used for internet searching. Mobile friendliness determinations may be effectuated using, for example, a site comparator, a markup language comparator, a mobile-specific response examiner, a site content analyzer, and so forth. The implementations described herein are not limited to an internet, for they are applicable generally to network and/or device resources.

In another described implementation, a data structure comprises an internet index with multiple internet site entries having one or more associated mobile-friendliness indications. The mobile-friendliness indications may be general affirmative indications of mobile friendliness or specific indications of mobile-friendliness that identify a specific user agent type. In yet another described implementation, a search request having search terms is received, and a search is performed based thereon to produce a search results set. If the search requestor is a mobile device, the search results are ordered responsive to mobile-friendliness indications associated with the internet sites of the search results set.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Figure 1:
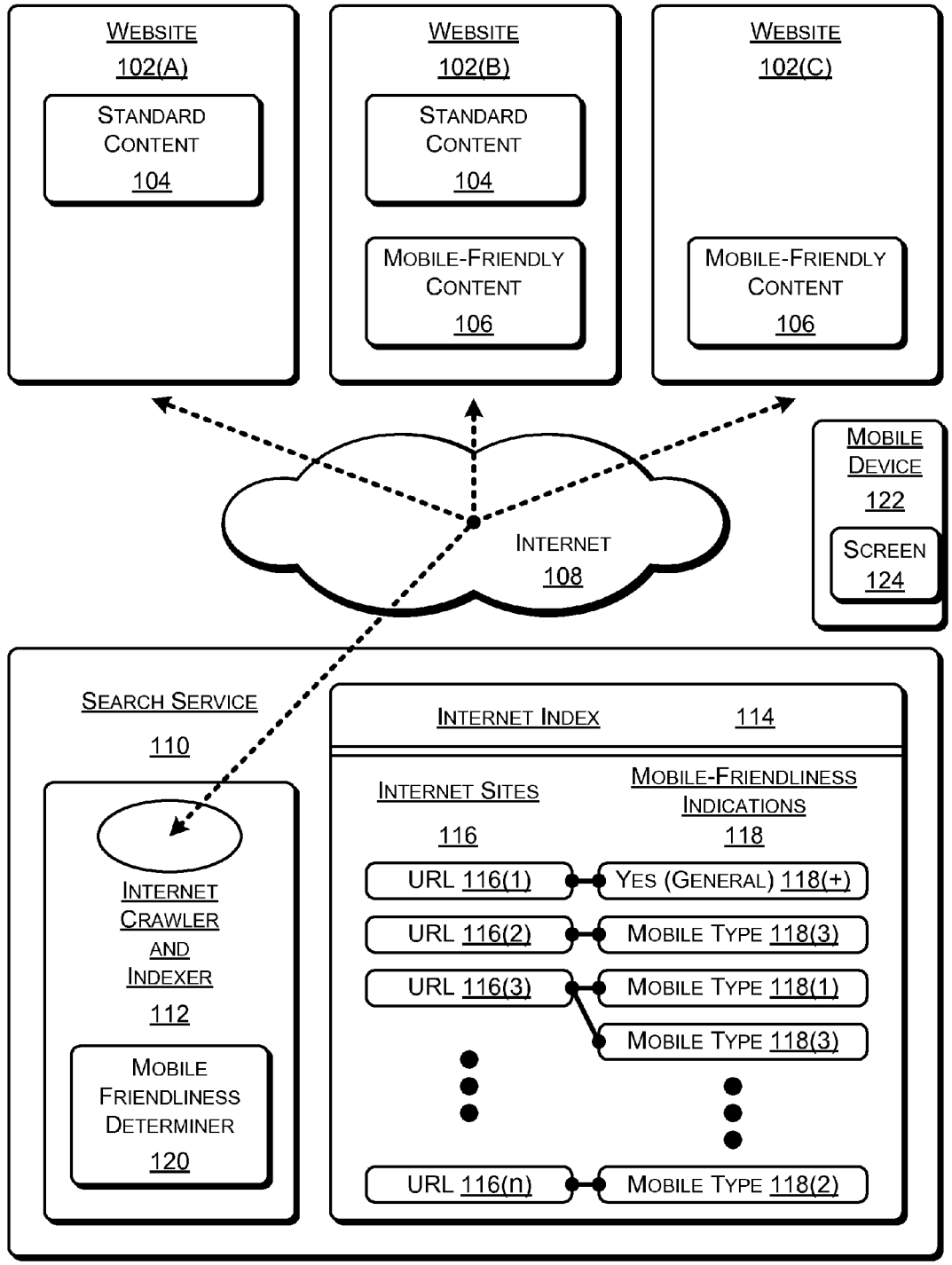
FIG. 1 is a block diagram example of a search engine scenario that includes a mobile-friendliness determiner and mobile-friendliness indications.

As described herein above, traditional search services do not accommodate the special features of mobile devices. For example, traditional search engines return an identical set of search results for a given search request regardless of whether the search requestor is a standard device or a mobile device.

After a set of search results are received at a mobile device, the requestor can elect to view the website of one or more of the search results. The selected websites are then displayed on a screen of the requesting mobile device. Unfortunately, many websites have pages that do not display well on the relatively smaller screens of mobile devices. Consequently, users of mobile devices may select search results corresponding to websites that cannot be displayed well, or maybe cannot be displayed at all, on their relatively smaller screens. Moreover, mobile devices are frequently connected to the internet via a network that offers a relatively-lower bandwidth and that causes relatively-higher latencies.

Hence, the internet searching experience of users of mobile devices can be streamlined and made more productive if the search results that they are sent correspond to internet sites that are targeted toward or at least appropriate for mobile devices. In an example described implementation, a search service annotates a search engine database with mobile-friendliness indications. A mobile friendliness determiner inspects uniform resource locators (URLs) of the search engine database to determine a mobile friendliness level.

In other words, one or more mobile-friendliness indications are stored in association with each URL of multiple URLs of the search engine database. When a search request having search terms is received from a mobile device, those URLs that comport with the search terms and that are associated with at least one mobile-friendliness indication are prioritized relatively higher than those URLs that only comport with the search terms. The mobile-friendly prioritized set of search results are then provided to the requesting mobile device.

Multiple example schemes for determining mobile friendliness are described herein. Accordingly, an example realization for a mobile friendliness determiner includes one or more of the following: a site comparator, a markup language comparator, a mobile-specific response examiner, a site content analyzer, and so forth. Additionally, scores from multiple implemented schemes may be combined to form a combined mobile-friendliness indication.

To facilitate understanding, this description is separated into three sections. A first section references FIGS. 1-3 and is entitled "Example Implementations for Mobile Friendly Internet Searches". A second section references FIGS. 4-8 and is entitled "Example Determinations of Mobile-Friendliness Indications". There is also a third section that references FIG. 9 and is entitled "Example Operating Environment for Computer or Other Device".

Example Implementations for Mobile Friendly Internet Searches

FIG. 1 is a block diagram example of a search scenario 100 that includes a mobile-friendliness determiner 120 and mobile-friendliness indications 118. As illustrated, search scenario 100 includes multiple websites 102 that are a part of and/or accessible via a network such as an internet 108. Search scenario 100 also includes a search service 110 and a mobile device 122.

Three websites 102(A), 102(B), and 102(C) are shown. Each website 102 includes standard content 104 and/or mobile-friendly content 106. Website 102(A) includes standard content 104. Website 102(B) includes both standard content 104 and mobile-friendly content 106. Website 102(C) includes mobile-friendly content 106.

In a described implementation, search service 110 includes an internet crawler and indexer 112 and an internet index 114. The internet crawler and indexer program may optionally be separated into two (or more) programs. Internet index 114 includes multiple respective internet sites 116 that are associated with multiple respective mobile-friendliness indications 118. Internet sites 116 are represented by the broader terminology of uniform resource locators (URLs) 116, which can comprise a location on any network and/or device. Generally, internet index 114 can be configured as having multiple entries with each entry including one or more fields for URLs 116 and mobile-friendliness indications 118.

Search service 110 also includes a mobile friendliness determiner 120. Mobile friendliness determiner 120 may optionally be part of internet crawler and indexer 112. Mobile friendliness determiner 120 is adapted to determine mobile friendliness of websites 102, including individual pages thereof. In a described implementation, mobile friendliness is expressed in terms of mobile-friendliness indications 118.

Standard content 104 is content that is designed and/or intended for experiencing (e.g., viewing) with a traditional device, such as a personal computer. Mobile-friendly content 106 is content that is designed and/or intended for mobile devices 122. For example, mobile-friendly content 106 may be adapted for display on the relatively-smaller screens 124 of mobile devices 122. For instance, mobile phones, personal digital assistants (PDAs), etc. generally have smaller screens. Additionally, mobile-friendly content 106 may be adapted for display by one or more user agents (e.g., web browsers) that are targeted for mobile devices 122.

In operation of search scenario 100, internet crawler and indexer 112 crawls across internet 108 to search websites 102 and index the contents 104 and 106 of the searched websites 102. Mobile friendliness determiner 120 is applied to each searched website 102. Mobile friendliness determiner 120 is adapted to detect if all or part of the content of a website 102 comprises mobile-friendly content 106. Example approaches to such mobile-friendliness determinations of mobile friendliness determiner 120 are described herein below with particular reference to FIGS. 4-8.

Each searched URL 116 of the "n" URLs 116(1 ... n) is stored into internet index 114 as an internet site 116. If a particular URL 116 is determined to include mobile-friendly content 106, a particular mobile-friendliness indication 118 is stored into internet index 114 in association with the particular URL 116. Associations between URLs 116 and mobile-friendliness indications 118 are indicated in FIG. 1 with thick lines terminated with small solid circles.

As illustrated generally, internet index 114 includes multiple respective internet sites 116 that are associated with respective one(s) of multiple possible mobile-friendliness indications 118. Specifically, URL 116(1) is associated with an affirmative general mobile-friendliness indication 118(+). URL 116(2) is associated with a third mobile type of mobile-friendliness indication 118(3). URL 116(3) is associated with both a first mobile type and a third mobile type of mobile-friendliness indications 118(1) and 118(3). URL 116(n) is associated with a second mobile type of mobile-friendliness indication 118(2).

Although not all possible permutations are shown, URLs 116 of internet sites 116 that are stored into internet index 114 may be associated with no mobile-friendliness indication 118, with one mobile-friendliness indication 118, or with two or more mobile-friendliness indications 118. Also, mobile-friendliness indications 118 may alternatively be stored in a mobile-related internet index 114 (with or without URLs 116) instead of a primary internet index 114 of search service 110.

Mobile friendliness determiner 120 may determine that a given URL 116 is affirmatively mobile friendly in a general sense, as indicated by general mobile-friendliness indication 118(+). General mobile-friendliness indications 118(+) may be determined only for individual URLs 116 that appear friendly to mobile devices generally but not necessarily to any specific mobile type. Alternatively, general mobile-friendliness indications 118(+) may be determined as a rule in implementations that focus on a yes or no decision with respect to mobile-friendliness without regard to any specific user agent types.

When specific mobile-friendliness indications 118(1,2,3) are determined, such specific mobile-friendliness indications 118(1,2,3) correspond to specific mobile device user agent types, including specific mobile device types. For example, PDAs that utilize a browser that is intended to interpret standard Hyper Text Markup Language (HTML) (e.g., Pocket IE™ from Microsoft®, browsers for some other palm or pocket-sized devices, etc.), can provide users a better experience if the displayed web pages are targeted to a typical size of display screens 124 for mobile devices 122.

There are also multiple browser user agents that are used primarily by mobile devices 122. Examples of such mobile-device targeted user agent types include: a wireless application protocol (WAP)-enabled browser, an information/internet mode (I-MODE) enabled browser, a WAP 2.0 (WAP2) enabled browser, and so forth. WAP browsers are designed to interpret wireless markup language (WML) website pages. I-MODE browsers, which are especially popular in Japan, are designed to interpret compact hypertext markup language (cHTML) website pages. WAP2 browsers are designed to interpret extensible hypertext markup language (XHTML) website pages.

Thus, by way of example, a WAP-enabled user agent may correspond to a first type of mobile-friendliness indication 118(1). An I-MODE-enabled user agent may correspond to a second type of mobile-friendliness indication 118(2), and a WAP2-enabled user agent may correspond to a third type of mobile-friendliness indication 118(3). Also, one or more browsers that are designed for use on mobile devices may correspond to a fourth type of mobile-friendliness indication 118(4) (not explicitly illustrated). These browsers for, e.g., palm or pocket-sized devices may alternatively be separated into individual mobile-friendliness indication types 118. Furthermore, although only three specific mobile-friendliness indications 118(1,2,3) are shown in FIG. 1, fewer or more than the three illustrated indication types may be employed in an actual implementation.

Figure 2:
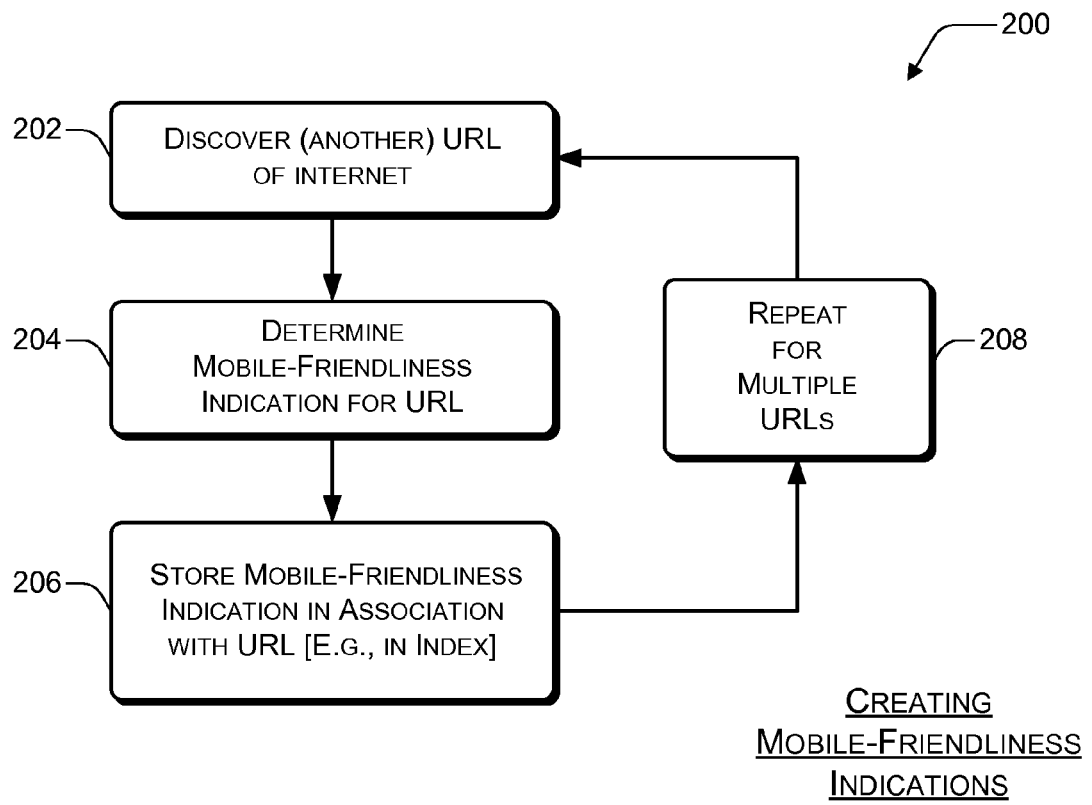
FIG. 2 is a flow diagram that illustrates an example of a method for creating mobile-friendliness indications.

FIG. 2 is a flow diagram 200 that illustrates an example of a method for creating mobile-friendliness indications. Flow diagram 200 includes four (4) blocks 202-208. Although the actions of flow diagram 200 may be performed in other environments and with a variety of hardware and software combinations, FIG. 1 is used in particular to illustrate certain aspects and examples of the method. By way of example only, the actions of flow diagram 200 may be performed by an internet crawler and indexer 112 and a mobile friendliness determiner 120 of a search service 110.

At block 202, a URL of an internet is discovered. For example, an internet crawler and indexer 112 may discover a URL 116 of a website 102 that is a part of and/or accessible via internet 108. Usually, internet crawler and indexer 112 is given a seed set of URLs 116 to search and index. During the searching and indexing process, internet crawler and indexer 112 adds new URLs 116 to the seed set in order to expand the total number of URLs 116 and therefore "crawl" across internet 108.

At block 204, a mobile-friendliness indication for the URL is determined. For example, mobile friendliness determiner 120 may determine a particular mobile-friendliness indication 118 for a particular URL 116 of a particular website 102. (Example determinations of mobile-friendliness indications 118 are described further herein below with particular reference to FIGS. 4-8.) For instance, mobile friendliness determiner 120 may determine that the particular URL 116 warrants a general mobile-friendliness indication 118(+) and/or one or more specific mobile-friendliness indications 118(1, 2,3). Also, mobile friendliness determiner 120 may determine that the particular URL 116 warrants no mobile-friendliness indication 118 (or a general negative mobile-friendliness indication 118(−)).

At block 206, the determined mobile-friendliness indication is stored in association with the URL (e.g., in a search index). For example, the determined mobile-friendliness indication 118 may be stored in association with the URL 116 under investigation in internet index 114 of search service 110.

At block 208, the actions of blocks 202-206 are repeated for multiple URLs by discovering another URL at block 202. In this manner, websites 102 with mobile-friendly content 106, such as websites 102(B) and 102(C), can be determined by mobile friendliness determiner 120 and identified within internet index 114. The stored mobile-friendliness indications 118 can be used to the benefit of users that request searches from mobile devices 122 as is described below with particular reference to FIG. 3.

Figure 3:
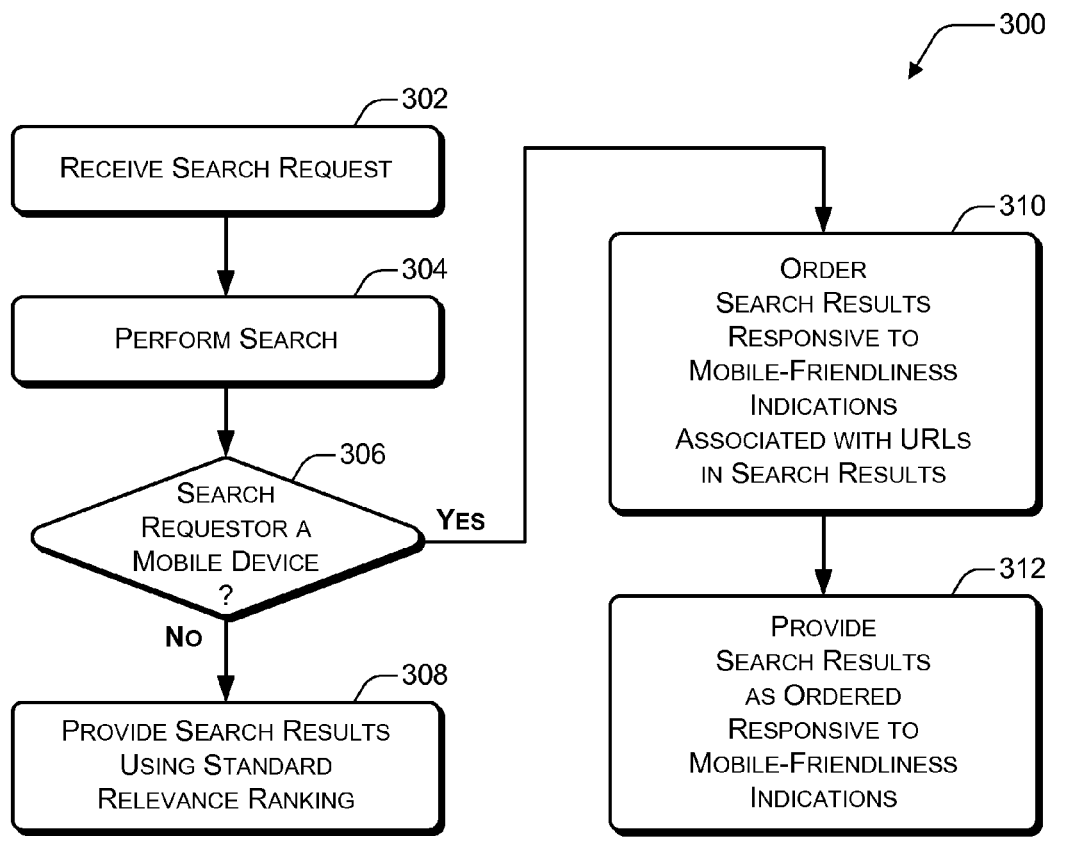
FIG. 3 is a flow diagram that illustrates an example of a method for using mobile-friendliness indications.

FIG. 3 is a flow diagram 300 that illustrates an example of a method for using mobile-friendliness indications. Flow diagram 300 includes six (6) blocks 302-312. Although the actions of flow diagram 300 may be performed in other environments and with a variety of hardware and software combinations, FIG. 1 is used in particular to illustrate certain aspects and examples of the method. By way of example only, the actions of flow diagram 300 may be performed by a search service 110 having an internet index 114 that includes respective mobile-friendliness indications 118 associated with respective internet sites 116.

At block 302, a search request is received. For example, a search request having one or more search terms may be received at search service 110 from a mobile device 122. At block 304, a search is performed responsive to the received search request and based on the one or more search terms. For example, a search may be performed by search service 110 that is based on the search terms of the received search request and using internet index 114. The search produces a set of search results.

At block 306, it is determined if the search requestor is a mobile device. For example, it may be determined if the search request originates from a mobile-device-targeted user agent and/or a mobile device 122. For instance, a user agent string that accompanies the search request can be examined to determine if the originator is a user agent that normally executes on a mobile device.

Other alternative techniques include, but are not limited to: (i) a requesting mobile device may affirmatively indicate that it is such a mobile device, (ii) a user-agent header may be examined, (iii) an accepts header may be examined (e.g., it may be examined to determine if the device does not accept a desktop markup), (iv) an IP address of the requestor may be examined (e.g., the IP address may be examined to determine if it is part of a block of IP addresses that are known to belong to a mobile carrier), and so forth. Additionally, a separate URL may be established to handle (e.g., be dedicated to) mobile-oriented searches. Search requests made to the mobile-dedicated URL site may be assumed to originate from a mobile device. (Optionally, search requests to a standard site may be redirected to the mobile-dedicated site if the search request is otherwise determined to be from a mobile device.)

If the search requestor is not a mobile device (as determined at block 306), then at block 308 the produced search results are provided to the requestor using a standard relevance ranking. If, on the other hand, the search requestor is determined to be a mobile device, then at block 310 the search results are ordered responsive to mobile-friendliness indications that are associated with the URLs in the search results. For example, search results may be ordered (including reordered if already ordered once before) responsive to respective mobile-friendliness indications 118 that are associated with respective URLs 116 included within the set of search results. For instance, those URLs 116 in an initial search results set that are associated with at least one mobile-friendliness indication 118 can be moved upward toward the top of a new, mobile-friendly ordered set of search results.

Generally, search results are ordered using well known and/or proprietary factors. Such factors may include, for example, the frequency of appearance of search terms, the popularity of a given URL, the location of the search terms, and so forth. In a described implementation, a new factor is introduced and applied pertaining to mobile-friendliness, as represented by mobile-friendliness indications 118, when a search requestor is a mobile device 122.

By way of example only, URLs 116 without an affirmative mobile-friendliness indication 118 of any type may be automatically moved to the bottom of a mobile-friendly ordered search results list. Alternatively, a URL 116 that is not especially mobile friendly may be kept at the top of the search results list if it otherwise receives a high ranking score due to other (e.g., traditional/standard) factors. Regardless, ordering may also include moving at least one URL 116 of the set of search results to a higher ranking position if the at least one URL 116 is associated with one or more mobile-friendliness indications. Such a movement effectively concomitantly lowers the ranking of other URLs 116. Additionally, URLs 116 that are associated with mobile-friendliness indications 118 (1, 2, or 3) of a specific type may be especially prioritized highly when a user agent search requestor matches the specific type of determined mobile-friendliness indication 118 (1, 2, or 3).

At block 312, the search results, as ordered responsive to the mobile-friendliness indications, are provided to the mobile requestor. For example, a mobile friendly search results set that is ordered responsive to mobile-friendliness indications 118 as associated with the retrieved URLs 116 may be provided to mobile device 122.

Multiple other approaches may alternatively be implemented. For example, if search service 110 checks if a search requestor is a mobile device 122 prior to conducting the search, search service 110 can elect to narrow the search to those URLs 116 in internet index 114 that are associated with at least one mobile-friendliness indication 118. Also, search service 110 may elect to focus the search on those URLs 116 associated with at least one mobile-friendliness indication 118 having a score value higher than a predetermined threshold. In either case, the search results can still be ranked using traditional factors and/or mobile-friendliness indications 118.

Most implementations described herein pertain to an internet index 114 having URLs 116 that correspond to websites 102 having standard content 104 or mobile-friendly content 106 (or both). However, internet index 114 may alternatively comprise a bifurcated search engine database (e.g., two fully or partially separate databases), with one database directed to those websites 102 having at least some standard content 104 and another directed to those websites 102 having at least some mobile-friendly content 106.

Also, the requesting mobile device 122 may be given one or more options relating to a desired format of a returned set of search results. For example, search service 110 may provide the option to receive a standard set of search results (e.g., with no mobile friendliness prioritization), a mobile-friendly ordered set of search results (e.g., one that does prioritize URLs 116 associated with mobile-friendliness indications 118), and/or a mobile-friendly limited set of search results (e.g., one that excludes those URLs 116 that are not associated with any mobile-friendliness indications 118). The option may be presented at any time during the search request process, including prior to a search or after one (e.g., default type of) search results set has been provided.

Example Determinations of Mobile-Friendliness Indications

This section relates to FIGS. 4-8. The actions of flowcharts 204(A), 204(B), 204(C), 204(D), and 204(X) of FIGS. 4, 5, 6, 7, and 8, respectively, illustrate example implementations for the action(s) of block 204 of FIG. 2.

As noted herein above, multiple example schemes for determining mobile friendliness are described herein. A site comparator example is described herein below with particular reference to FIG. 4. A markup language comparator example is described below with particular reference to FIG. 5. A mobile-specific response examiner example is described with particular reference to FIG. 6. And a site content analyzer example is described with particular reference to FIG. 7. Additionally, a combined mobile-friendliness indication determiner example is described with particular reference to FIG. 8.

Although the actions of the flow diagrams of FIGS. 4-8 may be performed in other environments and with a variety of hardware and software combinations, FIG. 1 is used in particular to illustrate certain aspects and examples of the method. By way of example only, the actions of flow diagrams 204(A), 204(B), 204(C), 204(D), and 204(X) may be performed by a mobile friendliness determiner 120 of a search service 110 having an internet index 114 that includes respective mobile-friendliness indications 118 associated with respective internet sites 116 corresponding to URLs 116. Although the terminology "website" is primarily used in the context of FIGS. 4-8 for the sake of clarity, broader terminology there for includes "internet site", and still broader terminology includes "URL".

Figure 4:
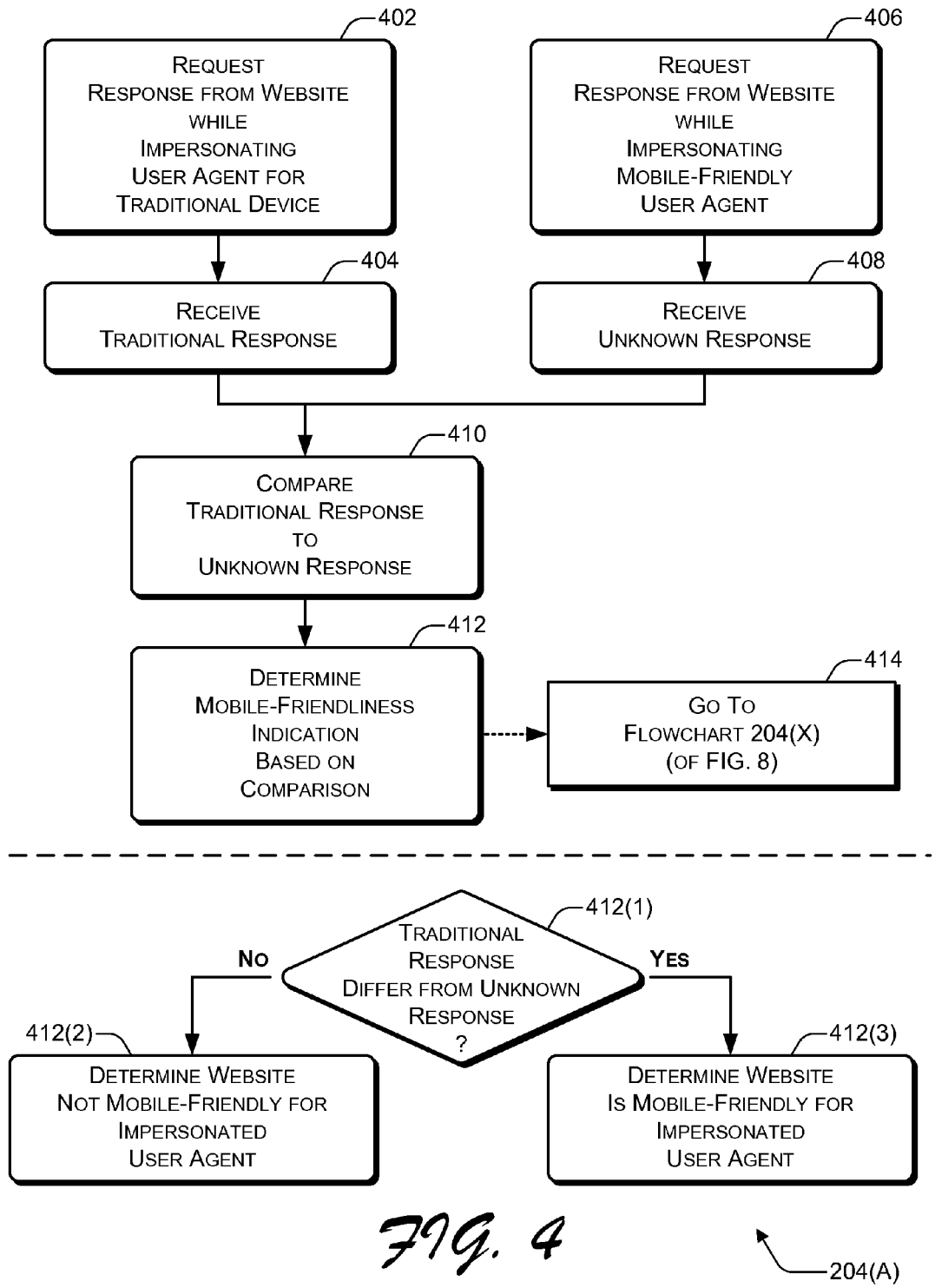
FIG. 4 is a flow diagram that illustrates an example of a first method for determining a mobile-friendliness indication.

FIG. 4 is a flow diagram 204(A) that illustrates an example of a first method for determining a mobile-friendliness indication. Flow diagram 204(A) includes seven (7) "primary" blocks 402-414 and three (3) "secondary" blocks 412(1,2,3). At block 402, a response from a website is requested while impersonating a user agent for a traditional device. For example, a web page may be requested using a traditional internet browser (e.g., Microsoft® Internet Explorer™, Netscape™, Firefox™, etc.).

At block 406, a response from a website is requested while impersonating a mobile-friendly user agent. For example, a web page may be requested using an internet browser that targets a palm or pocket-sized device (e.g., Microsoft® Pocket IE™, a Palm™-based browser, etc.). For instance, the impersonations may be effectuated by constructing a user agent string that connotes that the originating user agent is the user agent to be impersonated. At block 404, a traditional response is received from the website. At block 408, an unknown response is received from the website.

At block 410, the traditional response is compared to the unknown response. At block 412, at least one mobile-friendliness indication is determined based on the comparison. The at least one mobile-friendliness indication may comprise a general negative indication, a general affirmative indication, a specific user agent type indication, and so forth. The action(s) of block 412 are described further below with particular reference to the three (3) "secondary" blocks 412(1,2,3). At block 414, an overall mobile-friendliness determination procedure may be continued by determining a combined mobile-friendliness indication (by performing the actions of flowchart 204(X) of FIG. 8).

At block 412(1), it is determined if the traditional response differs from the unknown response. If not, then at block 412(2) the website being investigated is determined to not be mobile-friendly for the impersonated user agent. If, on the other hand, the traditional response is determined to differ from the unknown response, then at block 412(3) the website being investigated is determined to be mobile-friendly at least with respect to the impersonated user agent.

The technique of flowchart 204(A) is especially applicable to those mobile-targeted user agents that interpret the same type of markup language (e.g., HTML) as traditional user agents. Hence, the actions of flowchart 204(A) may be repeated for multiple mobile-targeted user agents of interest.

Figure 5:
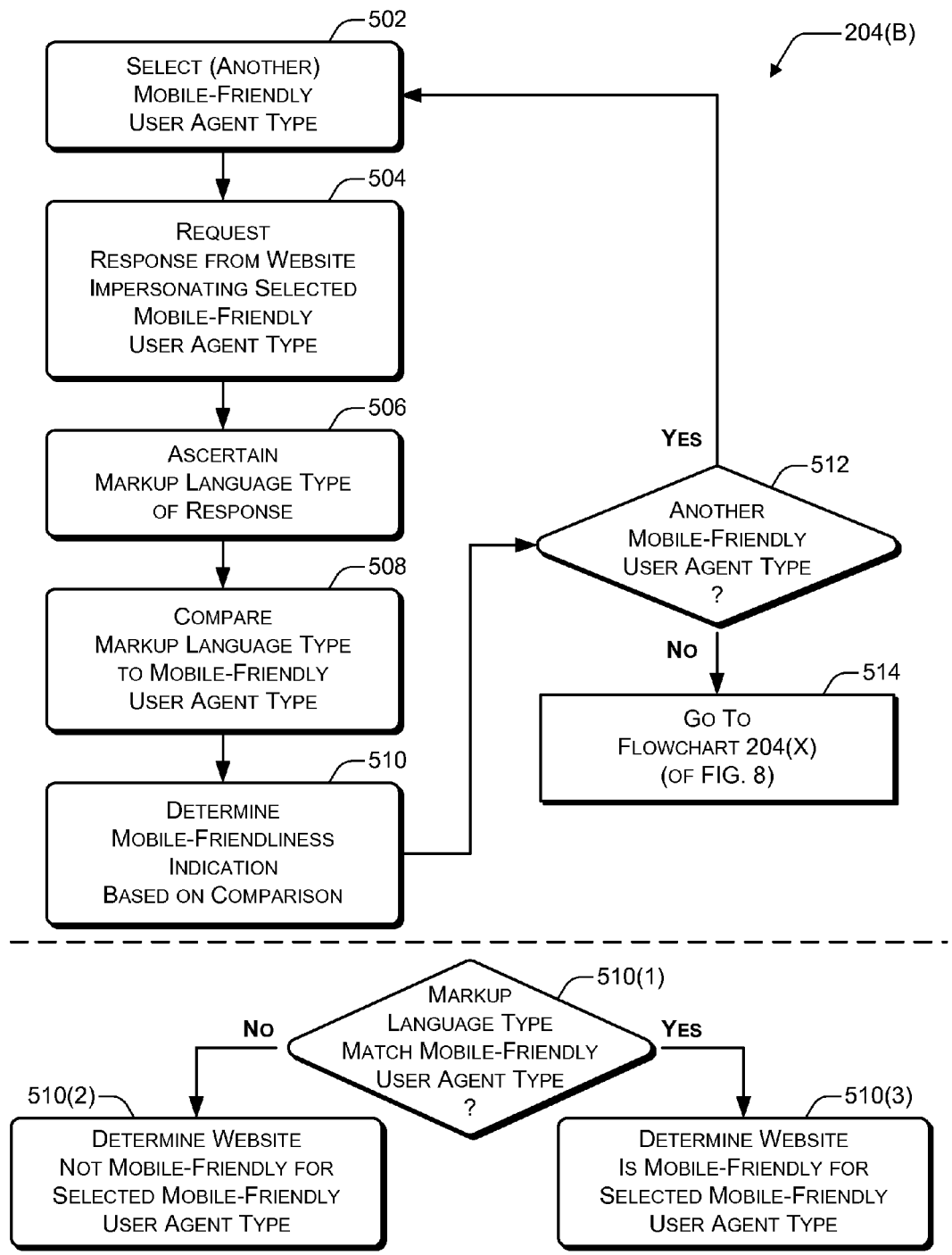
FIG. 5 is a flow diagram that illustrates an example of a second method for determining a mobile-friendliness indication.

FIG. 5 is a flow diagram 204(B) that illustrates an example of a second method for determining a mobile-friendliness indication. Flow diagram 204(B) includes seven (7) "primary" blocks 502-514 and three (3) "secondary" blocks 510(1,2,3). At block 502, a mobile-friendly user agent type is selected. Example mobile-friendly user agent types include, but are not limited to, a WAP-compatible user agent, an I-MODE-compatible user agent, a WAP2-compatible user agent, and so forth.

At block 504, a response from a website is requested while impersonating the selected mobile-friendly user agent type. After receiving a response from the website, at block 506 a markup language type of the response is ascertained. For example, a page header of the response may be inspected to extract the markup language type used in the response.

At block 508, the ascertained markup language type is compared to the selected mobile-friendly user agent type. At block 510, at least one mobile-friendliness indication is determined based on the comparison. The action(s) of block 510 are described further below with particular reference to the three (3) "secondary" blocks 510(1,2,3).

At block 512, it is checked if there is another mobile-friendly user agent type to select. If so, then at block 502 another mobile-friendly user agent type is selected, and the method is repeated. Otherwise, at block 514, an overall mobile-friendliness determination procedure may be continued by determining a combined mobile-friendliness indication (by performing the actions of flowchart 204(X) of FIG. 8).

At block 510(1), it is determined if the markup language type of the received response matches the selected mobile-friendly user agent type. If not, then at block 510(2) the website being investigated is determined to not be mobile-friendly for the selected mobile-friendly user agent type. If, on the other hand, the markup language type of the received response is determined to match the selected mobile-friendly user agent type, then at block 510(3) the website being investigated is determined to be mobile-friendly for the selected mobile-friendly user agent type. By way of example only, a WAP user agent type matches WML website pages, an I-MODE user agent type matches cHTML website pages, and a WAP2 user agent type matches XHTML website pages.

Figure 6:
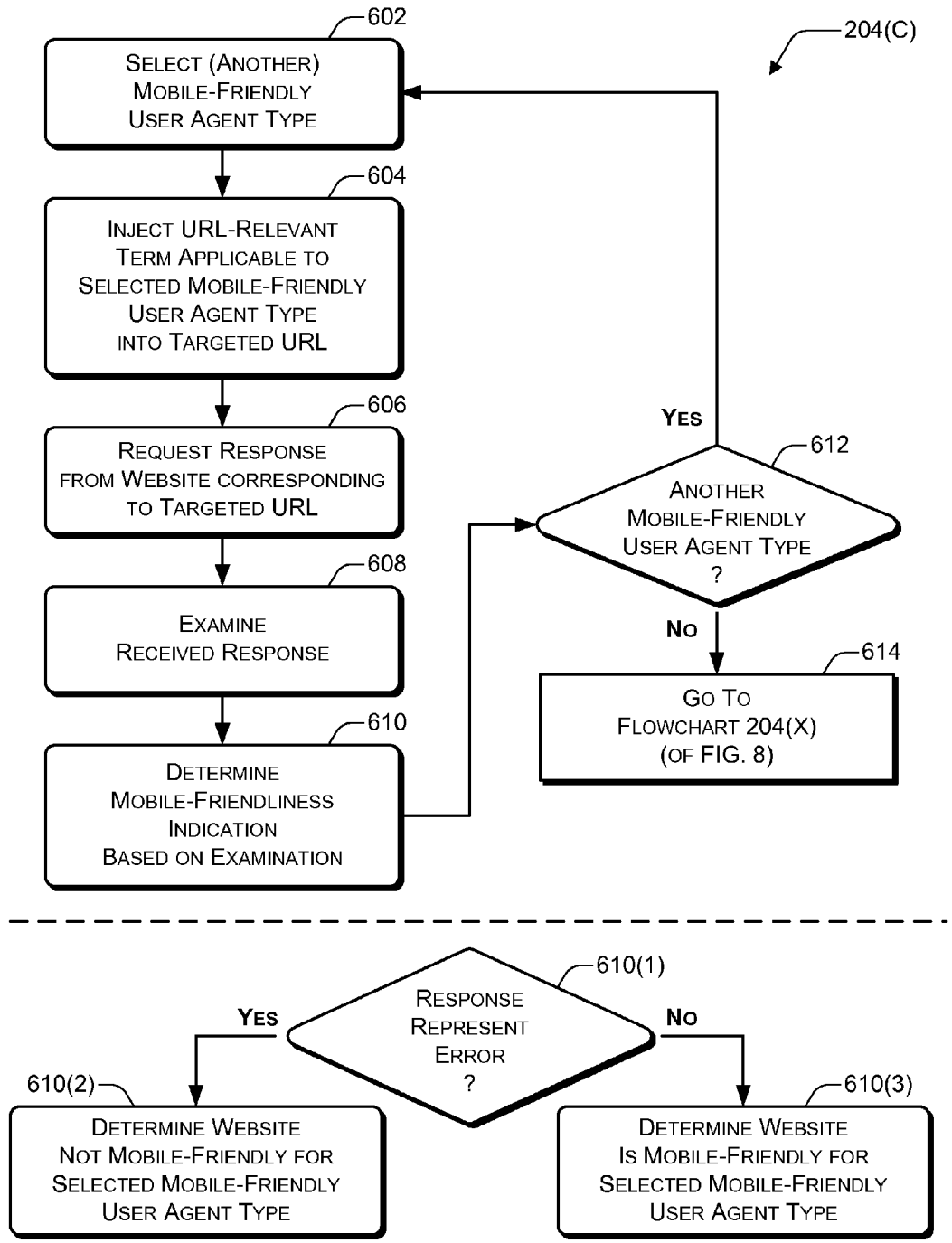
FIG. 6 is a flow diagram that illustrates an example of a third method for determining a mobile-friendliness indication.

FIG. 6 is a flow diagram 204(C) that illustrates an example of a third method for determining a mobile-friendliness indication. Flow diagram 204(C) includes seven (7) "primary" blocks 602-614 and three (3) "secondary" blocks 610(1,2,3). At block 602, a mobile-friendly user agent type is selected. Example mobile-friendly user agent types include, but are not limited to, a WAP-compatible user agent, an I-MODE-compatible user agent, a WAP2-compatible user agent, a PDA-targeted user agent, and so forth.

At block 604, a URL-relevant term that is applicable to the selected mobile-friendly user agent type is injected into a targeted URL to form a modified URL. For example, "/wml", "/pda", "/pocketpc" may be appended to the end of the targeted URL to form the modified URL. However, other URL-relevant terms may be injected into the targeted URL at other locations (e.g., the beginning, the middle, etc.). At block 606, a response from a website corresponding to the targeted URL is requested with the modified URL.

After a response is received as a result of requesting a response from the website (as performed at block 606), at block 608 this response is examined. (This response may be a general network response or a response originating from the targeted URL.) For example, the response may be examined to attempt to detect the presence of substantive content. At block 610, at least one mobile-friendliness indication is determined based on the examination. The action(s) of block 610 are described further below with particular reference to the three (3) "secondary" blocks 610(1,2,3).

At block 612, it is checked if there is another mobile-friendly user agent type to select. If so, then at block 602 another mobile-friendly user agent type is selected, and the method is repeated. Otherwise, at block 614, an overall mobile-friendliness determination procedure may be continued by determining a combined mobile-friendliness indication (by performing the actions of flowchart 204(X) of FIG. 8).

At block 610(1), it is determined if the response represents an error (e.g., if it implicitly or explicitly communicates an error status/result). For example, the response may be a general error (e.g., Internet Error 404) or a specific error generated by the targeted URL (e.g., a page not found on this website error). If the response is determined to represent an error, then at block 610(2) the website being investigated is determined to not be mobile-friendly for the selected mobile-friendly user agent type. If, on the other hand, the received response is not determined to represent an error, then at block 610(3) the website being investigated is determined to be mobile-friendly for the selected mobile-friendly user agent type.

The illustrated method of flowchart 204(C) may be modified so that multiple URL-relevant terms may be injected into multiple locations of each targeted URL. To handle these permutations, the actions of blocks 604-610 may be repeated for each such URL-relevant term and targeted URL location possibility. Repeating these actions is especially pertinent until a mobile-friendly modified URL for a selected mobile-friendly user agent type is determined (e.g., at block 610(3)).

Figure 7:
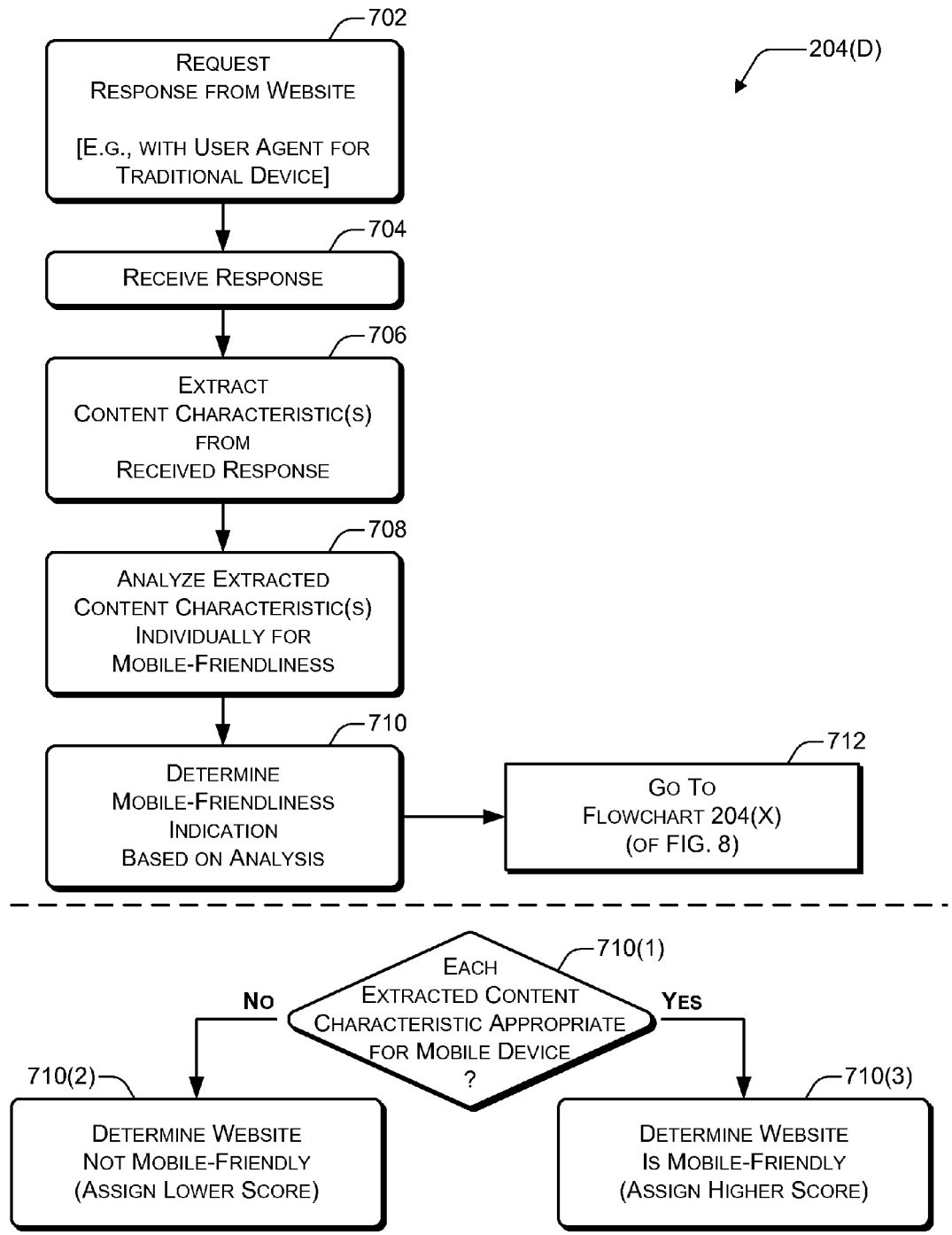
FIG. 7 is a flow diagram that illustrates an example of a fourth method for determining a mobile-friendliness indication.

FIG. 7 is a flow diagram 204(D) that illustrates an example of a fourth method for determining a mobile-friendliness indication. Flow diagram 204(D) includes six (6) "primary" blocks 702-712 and three (3) "secondary" blocks 710(1,2,3). At block 702, a response from a website is requested. For example, the response may be requested using a traditional user agent of a non-mobile device. The technique of flowchart 204(D) is especially relevant for determining if a website is capable of being at least adequately displayed on a screen 124 of a mobile device 122 even if the website under investigation is not specifically intended to be viewed by mobile devices 122 and/or does not provide a specially encoded or reserved website section.

At block 704, a response is received from the targeted website. At block 706, one or more content characteristics are extracted from the received response. For example, one or more frames, scripts, or images (if present); a total memory size; the presence of animation and/or sound (if any); etc. may be extracted. Other example content characteristics that may be extracted include, but are not limited to: style sheets, meta tags, object tags, applet tags, and so forth.

At block 708, the extracted content characteristics are individually analyzed for mobile-friendliness. At block 710, at least one mobile-friendliness indication is determined based on the analysis. The action(s) of block 710 are described further below with particular reference to the three (3) "secondary" blocks 710(1,2,3). At block 712, an overall mobile-friendliness determination procedure may be continued by determining a combined mobile-friendliness indication (by performing the actions of flowchart 204(X) of FIG. 8).

At block 710(1), it is determined if each extracted content characteristic is appropriate for a mobile device. If not, then at block 710(2) the website being investigated is determined to not be mobile-friendly; hence, a relatively lower score is assigned. If, on the other hand, each extracted content characteristic is determined to be appropriate for a mobile device, then at block 710(3) the website being investigated is determined to be mobile-friendly; hence, a relatively higher score is assigned.

By way of example only for a described implementation, scripts and frames are considered inappropriate for mobile devices. Images of a size that exceeds a predetermined image size threshold (e.g., in pixels) are considered inappropriate for mobile devices. The image size threshold may be set in dependence on the mobile devices to be serviced with searches and/or on the mobile device currently being serviced with one or more searches. The image size threshold, as well as the mobile device appropriateness of other content characteristics, may be tailored for each search depending on the capabilities of the requesting mobile device. For instance, full-fledged PDAs typically have a slightly larger screen 124 as compared to mobile devices 122 that are intended primarily for voice communications. Similarly, web pages of a size that exceeds a predetermined total memory size threshold (e.g., in bytes) are considered inappropriate for mobile devices. Finally, websites that include animation (either of a sufficient complexity or any level of animation) and/or extensive aural components may be considered inappropriate for mobile devices.

Additional examples of both positive and negative indications of mobile-friendliness or appropriateness are as follows. A positive indication is the presence of a style-sheet designed for mobile devices. For example, on a given website, styles or links to styles that target mobile-related media indicate mobile-friendliness. For instance, style types and/or media may reference "handheld". Another positive indication is the presence of meta tags that are intended to connote mobile-friendliness. For example, Pocket IE™ and/or Internet Explorer Mobile™ from Microsoft® Corporation may have websites created for them that include the following: <META NAME="HandheldFriendly" CONTENT="True">. A negative indication of mobile-friendliness is the presence of object tags because many mobile-device targeted user agents do not support ActiveX® controls. Another negative indication is the presence of applet tags because many mobile-device targeted user agents do not (at least by default) include an installed Java™ virtual machine.

Figure 8:
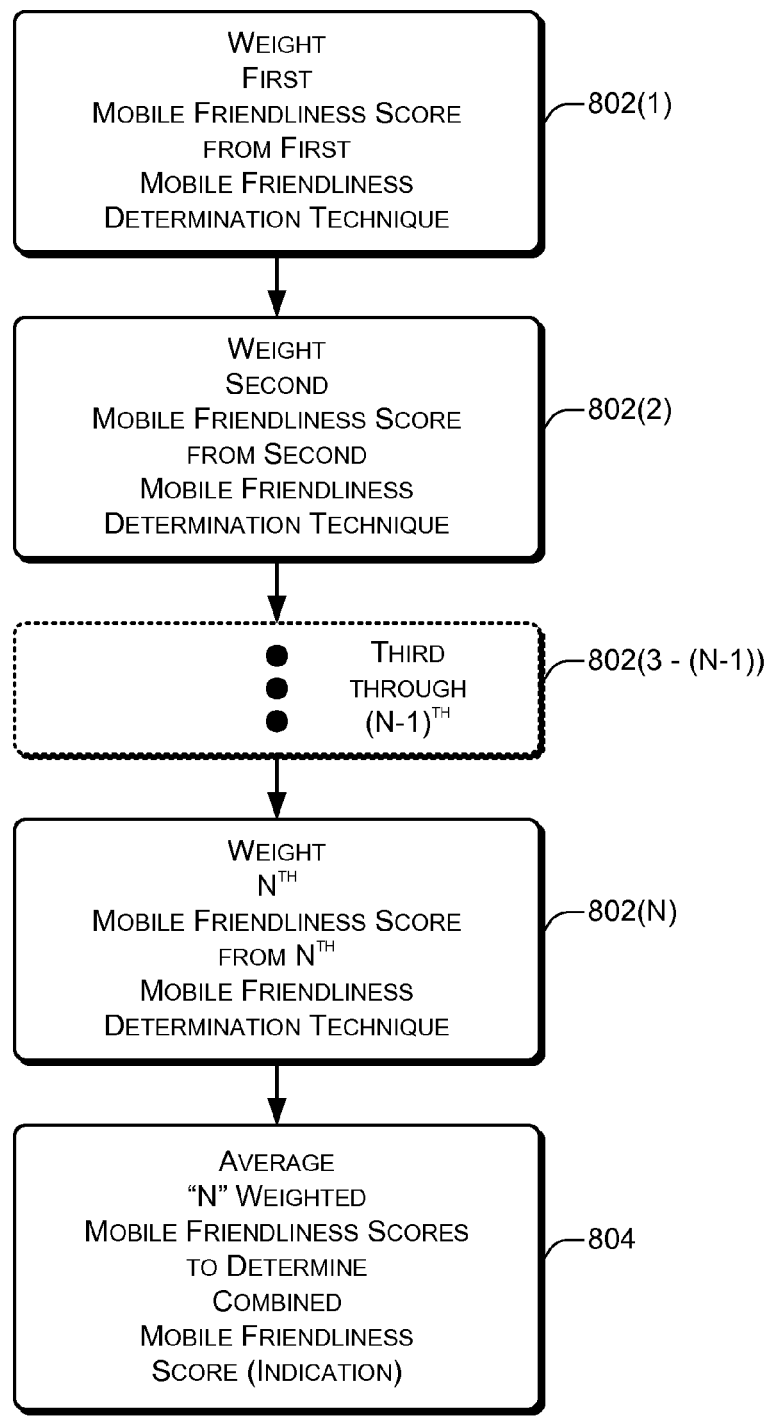
FIG. 8 is a flow diagram that illustrates an example of a method for determining a combined mobile-friendliness indication.

FIG. 8 is a flow diagram 204(X) that illustrates an example of a method for determining a combined mobile-friendliness indication. The method of flow diagram 204(X) produces a weighted average mobile friendliness score from multiple mobile friendliness scores produced from individual methods or mechanisms. These individual methods or mechanisms may be, for example, the techniques described herein above with particular reference to FIGS. 4-7.

Thus, mobile friendliness scores may result from one or more of the following mobile friendliness indication determination mechanisms: a site comparator, a markup language comparator, a mobile-specific response examiner, a site content analyzer, and so forth. As illustrated generally at blocks 802, the resulting scores are weighted. They may be weighted, for example, in accordance with importance and/or a likelihood of correct mobile friendliness determination. At block 804 generally, the weighted scores are averaged to determine a combined mobile friendliness score or indication.

In a described implementation, the scores range from 0 to 100. For some of the mechanisms, the resulting score is either 0 or 100. In other words, it is clear that a given website 102 under investigation is not mobile friendly (e.g., a 0 score), or it is clear that the given website 102 is (or at least is intended to be) mobile friendly (e.g., a score of 100). For example, the site comparator, the markup language comparator, and the mobile-specific response examiner mechanisms usually return a score of 0 or 100. However, they might also return a score of 50 to indicate that the result is indeterminate.

The site content analyzer mechanism, on the other hand, can return a range of scores depending on the content characteristics extracted and possibly on the threshold(s) met or exceeded by images, total memory sizes, and so forth. In general, a combined mobile-friendliness indication or score that exceeds 50 is considered mobile friendly, and a combined mobile-friendliness indication or score that is below 50 is considered not mobile friendly. Separate scores may be determined for different user agent types.

With reference to flowchart 204(X), at block 802(1), a first mobile friendliness score from a first mobile friendliness determination technique is weighted. At block 802(2), a second mobile friendliness score from a second mobile friendliness determination technique is weighted. At block 802(3) to block 802(N-1), a third through a $(N-1)^{th}$ mobile friendliness score from a respective third through $(N-1)^{th}$ mobile friendliness determination technique is weighted.

At block 802(N), an $N^{th}$ mobile friendliness score from an $N^{th}$ mobile friendliness determination technique is weighted. At block 804, the "N" weighted mobile friendliness scores are averaged to determine a combined mobile friendliness score or indication. It should be noted that other algorithms can alternatively be employed to produce a combined mobile-friendliness indication or score from multiple individual mobile-friendliness indications or scores.

The devices, actions, aspects, features, functions, procedures, modules, data structures, components, etc. of FIGS. 1-8 are illustrated in diagrams that are divided into multiple blocks. However, the order, interconnections, interrelationships, layout, etc. in which FIGS. 1-8 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for mobile friendly internet searches. Furthermore, although the description herein includes references to specific implementations (including a general device of FIG. 9), the illustrated and/or described implementations can be implemented in any suitable hardware, software, firmware, or combination thereof and using any suitable internet crawling and indexing approach(es), internet index/search engine database organization(s), mobile friendliness determination technique(s), mobile friendliness indication(s), user agent type(s), and/or scoring mechanism(s), and so forth.

Example Operating Environment For Computer or Other Device

Figure 9:
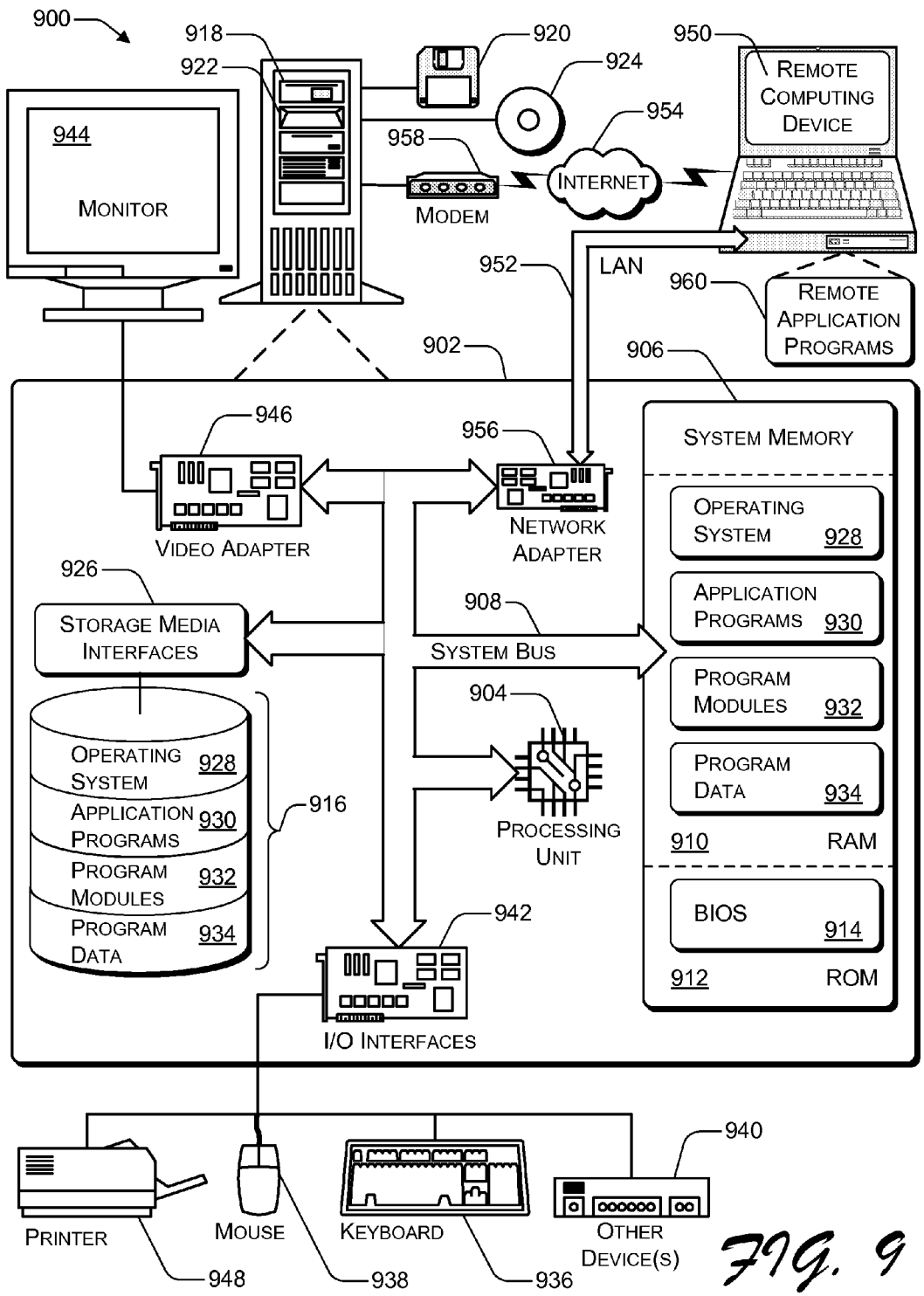
FIG. 9 illustrates an example of a computing (or general device) operating environment that is capable of (wholly or partially) implementing at least one aspect of mobile friendly internet searches as described herein.

FIG. 9 illustrates an example computing (or general device) operating environment 900 that is capable of (fully or partially) implementing at least one system, device, apparatus, component, arrangement, protocol, approach, method, procedure, media, application programming interface (API), some combination thereof, etc. for mobile friendly internet searches as described herein. Operating environment 900 may be utilized in the computer and network architectures described below.

Example operating environment 900 is only one example of an environment and is not intended to suggest any limitation as to the scope of use or functionality of the applicable device (including computer, network node, entertainment device, mobile appliance, general electronic device, etc.) architectures. Neither should operating environment 900 (or the devices thereof) be interpreted as having any dependency or requirement relating to any one or to any combination of components as illustrated in FIG. 9.

Additionally, implementations for mobile friendly internet searches may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for mobile friendly internet searches may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of mobile friendly internet searches, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 900 includes a general-purpose computing device in the form of a computer 902, which may comprise any (e.g., electronic) device with computing/processing capabilities. The components of computer 902 may include, but are not limited to, one or more processors or processing units 904, a system memory 906, and a system bus 908 that couples various system components including processor 904 to system memory 906.

Processors 904 are not limited by the materials from which they are formed or the processing mechanisms employed therein. For example, processors 904 may be comprised of semiconductor(s) and/or transistors (e.g., electronic integrated circuits (ICs)). In such a context, processor-executable instructions may be electronically-executable instructions. Alternatively, the mechanisms of or for processors 904, and thus of or for computer 902, may include, but are not limited to, quantum computing, optical computing, mechanical computing (e.g., using nanotechnology), and so forth.

System bus 908 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 902 typically includes a variety of processor-accessible media. Such media may be any available media that is accessible by computer 902 or another (e.g., electronic) device, and it includes both volatile and non-volatile media, removable and non-removable media, and storage and transmission media.

System memory 906 includes processor-accessible storage media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is typically stored in ROM 912. RAM 910 typically contains data and/or program modules/instructions that are immediately accessible to and/or being presently operated on by processing unit 904.

Computer 902 may also include other removable/non-removable and/or volatile/non-volatile storage media. By way of example, FIG. 9 illustrates a hard disk drive or disk drive array 916 for reading from and writing to a (typically) non-removable, non-volatile magnetic media (not separately shown); a magnetic disk drive 918 for reading from and writing to a (typically) removable, non-volatile magnetic disk 920 (e.g., a "floppy disk"); and an optical disk drive 922 for reading from and/or writing to a (typically) removable, non-volatile optical disk 924 such as a CD, DVD, or other optical media. Hard disk drive 916, magnetic disk drive 918, and optical disk drive 922 are each connected to system bus 908 by one or more storage media interfaces 926. Alternatively, hard disk drive 916, magnetic disk drive 918, and optical disk drive 922 may be connected to system bus 908 by one or more other separate or combined interfaces (not shown).

The disk drives and their associated processor-accessible media provide non-volatile storage of processor-executable instructions, such as data structures, program modules, and other data for computer 902. Although example computer 902 illustrates a hard disk 916, a removable magnetic disk 920, and a removable optical disk 924, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 900.

Any number of program modules (or other units or sets of processor-executable instructions) may be stored on hard disk 916, magnetic disk 920, optical disk 924, ROM 912, and/or RAM 910, including by way of general example, an operating system 928, one or more application programs 930, other program modules 932, and program data 934. These processor-executable instructions may include, for example, one or more of: a search service 110, an internet crawler and indexer 112, a mobile friendliness determiner 120, an internet index 114, some combination thereof, and so forth.

A user may enter commands and/or information into computer 902 via input devices such as a keyboard 936 and a pointing device 938 (e.g., a "mouse"). Other input devices 940 (not shown specifically) may include a microphone, joystick, game pad, satellite dish, serial port, video camera, scanner, and/or the like. These and other input devices are connected to processing unit 904 via input/output interfaces 942 that are coupled to system bus 908. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 944 or other type of display device may also be connected to system bus 908 via an interface, such as a video adapter 946. Video adapter 946 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 944, other output peripheral devices may include components such as speakers (not shown) and a printer 948, which may be connected to computer 902 via input/output interfaces 942.

Computer 902 may operate in a networked environment using logical connections to one or more remote computers, such as a remote computing device 950. By way of example, remote computing device 950 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 950 is illustrated as a portable computer that may include many or all of the elements and features described herein with respect to computer 902.

Logical connections between computer 902 and remote computer 950 are depicted as a local area network (LAN) 952 and a general wide area network (WAN) 954. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 902 is usually connected to LAN 952 via a network interface or adapter 956. When implemented in a WAN networking environment, computer 902 typically includes a modem 958 or other component for establishing communications over WAN 954. Modem 958, which may be internal or external to computer 902, may be connected to system bus 908 via input/output interfaces 942 or any other appropriate mechanism(s). It is to be appreciated that the illustrated network connections are examples and that other manners for establishing communication link(s) between computers 902 and 950 may be employed.

In a networked environment, such as that illustrated with operating environment 900, program modules or other instructions that are depicted relative to computer 902, or portions thereof, may be fully or partially stored in a remote media storage device. By way of example, remote application programs 960 reside on a memory component of remote computer 950 but may be usable or otherwise accessible via computer 902. Also, for purposes of illustration, application programs 930 and other processor-executable instructions such as operating system 928 are illustrated herein as discrete blocks, but it is recognized that such programs, components, and other instructions reside at various times in different storage components of computing device 902 (and/or remote computing device 950) and are executed by processor(s) 904 of computer 902 (and/or those of remote computing device 950).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A method implemented by a processor, the method comprising:
    identifying a mobile-friendliness indication for a website having a uniform resource locator (URL) by:
        requesting a first response using the URL of the website while impersonating a user agent for a personal computer;
        requesting a second response using the URL while impersonating a mobile browser;
        receiving the first response and the second response;
        comparing the first response to the second response; and
        determining the mobile-friendliness indication based at least on a comparison of the first response and the second response, wherein the mobile-friendliness indication indicates that the website is not mobile-friendly based at least partly on a first determination that the first response and the second response do not differ, and wherein the mobile-friendliness indication indicates that the website is mobile-friendly based at least partly on a second determination that the first response and the second response differ;
    receiving a search request having at least one search term from a search requestor;
    performing a search based at least in part on the at least one search term to produce a set of search results including the URL of the website;
    determining if the search requestor is a mobile device; and
    in response to determining that the search requestor is the mobile device, ordering, by the processor, one or more of the URLs of the set of search results by promoting at least one URL that is identified as being more mobile relevant and demoting at least one URL that is identified as being less mobile relevant using the mobile friendliness indications associated with the URL of the website, the mobile friendliness indication representing a varying extent to which the URLs of the website facilitates fully functionally presentation by the mobile device.

2. The method of claim 1, further comprising:
    providing to the mobile device at least a portion of the set of search results after the ordering and the demoting.

3. The method of claim 1, further comprising:
in response to determining that the search requestor is not the mobile device, providing at least a portion of the set of search results as ordered using a standard relevance ranking algorithm.

4. The method of claim 1, wherein the determining comprises:
inspecting a user agent string received from the search requestor.

5. The method of claim 1, wherein the ordering comprises:
moving at least one URL of the set of search results to a higher ranking position in response to determining that the at least one URL is associated with a mobile friendliness indication.

6. The method of claim 1, wherein the set of search results comprise one or more search results identified as being mobile-friendly.

7. The method of claim 1, wherein the set of search results identified as being mobile relevant are examined based at least in part on substantive content of the set of search results.

8. A computer-readable memory encoded with instructions that, when executed by a processor, causes the processor to perform acts comprising:
identifying a mobile-friendliness indication for a uniform resource locator (URL) by:
requesting a first response using the URL while impersonating a user agent for a personal computer;
requesting a second response using the URL while impersonating a mobile browser;
receiving the first response and the second response;
comparing of the first response to the second response; and
determining the mobile-friendliness indication based at least on a comparison of the first response to the second response, wherein the mobile-friendliness indication indicates that the URL is not mobile-friendly based at least partly on a first determination that the first response and the second response do not differ, and wherein the mobile-friendliness indication indicates that the URL is mobile-friendly based at least partly on a second determination that the first response and the second response differ;
identifying a mobile device to receive a search request, the search request having at least one search term;
performing a search based at least in part on the at least one search term; and
ordering a set of search results in response to the at least one search term by promoting at least one of the search results that is identified as being more mobile relevant and demoting at least one of the search results that is identified as being less mobile relevant using the mobile friendliness indications associated with the URL of the set of search results.

9. The computer-readable memory of claim 8, further comprising:
providing to the mobile device at least a portion of the set of search results based on the ordering and the demoting.

10. The computer-readable memory of claim 8, further comprising:
providing at least a portion of the set of search results as ordered using a standard relevance ranking algorithm.

11. The computer-readable memory of claim 8, further comprising:
inspecting a user agent string received from a search requestor.

12. The computer-readable memory of claim 8, wherein the ordering comprises:
moving at least one URL of the set of search results to a higher ranking position if the at least one URL is associated with mobile friendliness indication.

13. The computer-readable memory of claim 8, wherein the set of search results comprise one or more search results identified as being mobile-friendly.

14. The computer-readable memory of claim 8, wherein the set of search results identified as being mobile relevant are examined based at least in part on substantive content of the set of search results.

15. A system comprising:
one or more processors; and
a module having processor-executable instructions that, when executed, performs operations comprising:
requesting a first response from a first website while impersonating a user agent for a traditional device;
requesting a second response from a second website while impersonating a mobile-relevance user agent;
performing a comparison of the first response received to the second response received;
determining if the first website or the second website is mobile relevant based at least in part on a mobile-relevance indication from the comparison of the first response received to the second response received; and
moving a first reference of the first website or a second reference of the second website to a different position within a set of search results in response to an indication from a mobile device that the mobile device is requesting the set of search results.

16. The system of claim 15, wherein the first response and the second response are examined based at least in part on substantive content from the first website and the second website.

17. The system of claim 15, wherein the first website or the second website is mobile-friendly.

18. The method of claim 1, further comprising:
identifying a second mobile-friendliness indication for the website, the identifying the second mobile-friendliness indication comprising:
determining a markup language type of the second response;
performing a second comparison of the markup language type of the second response to a type of the mobile browser; and
determining the second mobile-friendliness indication based at least on the second comparison, wherein the second mobile-friendliness indication identifies the website as not mobile-friendly based partly on a result of the second comparison indicating that the markup language type of the second response and the type of the mobile browser differ, wherein the second mobile-friendliness indication identifies the website is mobile-friendly in response to the result of the second comparison indicating that the markup language type of the second response and the type of the mobile browser do not differ,
wherein the ordering is further based on the second mobile-friendliness indication.

19. The computer-readable memory of claim 8, wherein the acts further comprise:
identifying a second mobile-friendliness indication for the website, the identifying the second mobile-friendliness indication comprising:

determining a markup language type of the second response;

performing a second comparison of the markup language type of the second response to a type of the mobile browser; and determining the second mobile-friendliness indication based at least on the second comparison, wherein the second mobile-friendliness indication identifies the website as not mobile-friendly based partly on a result of the second comparison indicating that the markup language type of the second response and the type of the mobile browser differ, wherein the second mobile-friendliness indication identifies the website as mobile-friendly based partly on a result of the second comparison indicating that the markup language type of the second response and the type of the mobile browser do not differ, wherein the ordering is further based on the second mobile-friendliness indication.

20. The system of claim 15, wherein the module further performs operations comprising:

determining a markup language type of the second response;

performing a second comparison of the markup language type of the second response to a type of the mobile browser; and determining if the first website or the second website is mobile relevant based at least in part on a second mobile-relevance indication from the second comparison, wherein the moving is further based on the second mobile-relevance indication.

\* \* \* \* \*